(12) United States Patent
Crouch et al.

(10) Patent No.: US 7,313,515 B2
(45) Date of Patent: Dec. 25, 2007

(54) SYSTEMS AND METHODS FOR DETECTING ENTAILMENT AND CONTRADICTION

(75) Inventors: Richard S. Crouch, Cupertino, CA (US); Tracy Holloway King, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 11/415,609

(22) Filed: May 1, 2006

(65) Prior Publication Data

US 2007/0255555 A1 Nov. 1, 2007

(51) Int. Cl.
G06F 17/27 (2006.01)
(52) U.S. Cl. .......................................................... 704/9
(58) Field of Classification Search ...................... None
See application file for complete search history.

(56) References Cited

U.S. PATENT DOCUMENTS

| | | | |
|---|---|---|---|
| 5,438,511 A | 8/1995 | Maxwell, III | |
| 5,473,705 A * | 12/1995 | Abe et al. | 382/100 |
| 5,642,519 A * | 6/1997 | Martin | 704/9 |
| 5,748,973 A * | 5/1998 | Palmer et al. | 704/9 |
| 2004/0139060 A1 | 7/2006 | Maxwell, III | |

OTHER PUBLICATIONS

Crouch et al., "Scalability of redundancy detection in focused document collections", In Proceedings First International Workshop on Scalable Natural Language Understand (SCANALU-2002), 2002.*
Falkenhainer et al., "The structure-mapping engine: algorithm and examples", Artificial Intelligence, vol. 41, Issue 1, pp. 1-63, 1989.*
Tatu et al., "A semantic approach to recognizing textual entailment", Proceedings of the conference on Human Language Technology and Empirical Methods in Natural Language Processing, pp. 371-378, 2005.*
A. Andreevskaia, et al., "Can Swallow Predicate Argument Structures Determine Entailment", In Proc. of the PASCAL Challenges Workshop on Recognising Textual Entailment, Apr. 11-13, 2005, Southhampton, UK.
C. Baral et al., "Textual Interference by Combining Multiple Logic Programming Paradigms", In Interference for Textual Question Answering: Papers from the 2005 AAAI Workshop, ed. Sanda Harabagiu, Dan Moldovan, Srini Narayanan, Christopher Manning, Daniel Bobrow, Ken Forbus, 24-31. Technical Report WS-05-05. American Association for Artificial Intelligence, Menlo Park, California.

(Continued)

*Primary Examiner*—David Hudspeth
*Assistant Examiner*—Brian L. Albertalli
(74) *Attorney, Agent, or Firm*—Fay Sharpe LLP

(57) ABSTRACT

Techniques are provided for detecting entailment and contradiction. Packed knowledge representations for a premise and conclusion text are determined comprising facts about the relationships between concept and/or context denoting terms. Concept and context alignments are performed based on alignments scores. A union is determined. Terms are marked as to their origin and conclusion text terms replaced with by corresponding terms from the premise text. Subsumption and specificity, instantiability, spatio-temporal and relationship based packed rewrite rules are applied in conjunction with the context denoting facts to remove entailed terms and to mark contradictory facts within the union. Entailment is indicated by a lack of any facts from the packed knowledge representation of the conclusion in the union. Entailment and contradiction markers are then displayed.

23 Claims, 13 Drawing Sheets

OTHER PUBLICATIONS

S. Bayer et al., "Mitre's Submissions to EU Pascal RTE Challenge", In Proc. of the PASCAL Challenges Workshop on Recognising Textual Entailment, Apr. 11-13, 2005, Southhampton, UK.

F. Benamara et al. eds., "Knowledge and Reasoning for Answering Questions", Workshop associated with IJCAI05, Edinburgh, Jul. 30, 2005.

D. Bobrow et al., "A Basic Logic for Textual Davidsonian Interference", In Interference for Textual Question Answering: Papers from the 2005 AAAI Workshop, ed. Sanda Harabaglu, Dan Moldovan, Srini Narayanan, Christopher Manning, Daniel Bobrow, Ken Forbus, 24-31. Technical Report WS-05-05. American Association for Artificial Intelligence, Menlo Park, California.

J. Bos et al., "Recognizing Textual Entailment with Logical Interference", In Proc. of the Human Language Technology Conf. and Conf. on Empirical Methods in Natural Language Processing, Oct. 2005, p. 628-635, Association for Computational Linguistics, Vancouver, BC Canada.

J. Bos et al., "Combining Shallow and Deep NLP Methods for Recognizing Textual Entailment", In Proc. of the Pascal Challenges Workshop on Recognising Textual Entailment, Apr. 11-13, 2005, Southhampton, UK.

G. Bouma et al., "Reasoning over Dependency Relations for QA", In Proc. of the Workshop on Knowledge and Reasoning for Answering Questions, IJCAI-05, 2005.

K. Claessen et al., "New Techniques that Improve MACE-style Finite Model Finding", In Proc. of Workshop on Model Computation (MODEL), Jul. 29, 2003, CADE-19, Miami, Flordia.

C. Clark, et al., "Moving QA Towards Reading Comprehension Using Context and Default Reasoning", In Interference for Textual Question Answering: Papers from the 2005 AAAI Workshop, ed. Sande Harabagiu, Dan Moldovan, Srini Narayanan, Christopher Manning, Daniel Bobrow, Ken Forbus, 24-31. Technical Report WS-05-05. American Association for Artifical Intelligence, Menlo Park, California.

S. Colucci et al., "Semantic-Based Resource Retrieval using Non-Standard Inference Services in Description Logics" In Thirteenth Italian Symposium on Advanced Database Systems—Sistemi Evoluti per Basi di Dati (SEBD-2005), 2005, pp. 232-239.

C. Condoravdi et al., "Counting Concepts", In Proc. 13th Amsterdam Colloquium, Dec. 2001, pp. 67-72, Department of Philosophy, Universiteit van Amsterdam, Amsterdam, Netherlands.

C. Condorvadi et al., "Entailment, Intensionality and Text Understanding", In Proc. of the HLT-NAACL-2003 Workshop on Text Meaning, Edmonton, Canada, 2003.

C. Condorvadi et al., "Preventing Existence", In Proc. International Conf. on Formal Ontology in Info. Systems (FOIS-2001) p. 162-173, ACM Press NY, 2001.

D. Crouch, "Packed Rewriting for Mapping Semantics to KR",in Proc. of the Sixth International Workshop on Computational Semantics, May 2006.

D. Crouch et al., "Aquaint Pilot Knowledge-Based Evaluation: Annotation Guidelines", 2005.

C.M. Cumby et al., "Learning with Feature Description Logics", in Proceedings of the 12th International Conf. on Inductive Logic Programming, p. 32-47, Lecture Notes in Artifical Intelligence, vol. 2583, Springer Verlag, Heidelberg.

I. Dagan et al., "The PASCAL Recognizing Textual Entailment Challenge", In Proc. of the PASCAL Challenges Workshop on Recognising Textual Entailment, Apr. 11-13, 2005, Southhampton, UK.

R. De Salvo Braz et al., "An Inference Model for Semantic Entailment in Natural Language", 2005, AAAI'05.

R. De Salvo Braz et al., "An Interference Model for Semantic Entailment in Natural Language", A Poster Presentation, 2005, IJCAI'05.

R. De Salvo Braz et al., "An Inference Model for Semantic Entailment in Natural Language", In Proc. of the PASCAL Challenges Workshop on Recognising Textual Entailment, Apr. 11-13, 2005, Southhampton, UK.

R. De Salvo Braz et al., "Knowledge Representation for Semantic Entailment and Question-Answering", IJCAI'05: Workshop on Knowledge and Reasoning for Question Answering, 2005, Edinburgh, UK.

R. Delmonte et al., "VENSES- Linguistically-Based System for Semantic Evaluation", In Proc. of the PASCAL Challenges Workshop on Recognising Textual Entailment, Apr. 11-13, 2005, Southhampton, UK.

J. Van Eijck et al., "Ambiguity and Reasoning", CWI Technical Report, Technical Report: CS-R9616, CWI (Centre for Mathematics and Computer Science), Amsterdam, Netherlands, 1996.

A. Fowler et al., "Applying COGEX to Recognize Textual Entailment", In Proc. of the PASCAL Challenges Workshop on Recognising Textual Entailment, Apr. 11-13, 2005, Southhampton, UK.

A. Frank et al., "Querying Structured Knowledge Sources", In Proceedings of AAAI-05. Workshop on Question Answering in Restricted Domains, pp. 10-19, Jul. 2005, Pittsburgh, Pennsylvania.

A. Gleibman, "Knowledge Representation via Verbal Description Generalization: Alternative Programming in Sampletalk Language", In Inference for Textual Question Answering: Papers from the 2005 AAAI Workshop , ed. Sanda Harabagiu, Dan Moldovan, Srini Narayaran, Christopher Manning, Daniel Bobrow, Ken Forbus, 24-31. Technical Report WS-05-05. American Association for Artificial Intelligence, Menlo Park, California.

O. Gurevich et al., Deverbal Nouns in Knowledge Representation, In Proceedings of the Ninteenth International Florida Aritifcial Intelligence Research Society Conference, 54-56. Menlo Park, Calif.: AAAI Press.

A.D. Haghighi et al., "Robust Textual Inference via Graph Matching", In Proc. of the Human Language Technology Conf. and Conf. on Empirical Methods in Natural Language Processing, Oct. 2005, p. 387-394, Association for Computational Linguistics, Vancouver, BC Canada.

S. Harabagiu et al., "Question Answering Based on Temporal Inference", In Inference for Textual Question Answering: Papers from the 2005 AAAI Workshop, ed. Sanda Harabagiu, Dan Moldovan, Srini Narayanan, Christopher Manning, Daniel Bobrow, Ken Forbus, 24-31. Technical Report WS-05-05. American Association for Artificial Intelligence, Menlo Park, California.

T. Holloway King et al., "Ambiguity Management in Grammar Writing", Journal of Language and Computation, vol. 2, pp. 259-305, 2004.

V. Jijkoun et al., "Recognizing Textual Entailment Using Lexical Similarity", In Proc. of the PASCAL Challenges Workshop on Recognising Textual Entailment, Apr. 11-13, 2005, Southhampton, UK.

B. Katz et al., "Syntactic and Semantic Decomposition Strategies for Question Answering from Multiple Resources", In Inference for Textual Question Answering: Papers from the 2005 AAI Workshop, ed. Sanda Harabagiu, Dan Moldovan, Srini Narayanan, Christopher Manning, Daniel Bobrow, Ken Forbus, 24-31. Technical Report WS-05-05. American Association for Artificial Intelligence, Menlo Park, California.

E. Konig et al., "A General Reasoning Scheme for Underspecified Representations", In Logic, Language and Reasoning: Essays in Honour of Dov Gabbay, 1999, Kluwer Acad. Publishers, H. Ohlback, U. Reyle (eds.).

M. Kouylekov et al., "Recognizing Textual Entailment with Tree Edit Distance Algorithms", In Proc. of the PASCAL Challenges Workshop on Recognising Textual Entailment, Apr. 11-13, 2005, Southhampton, UK.

D. Lin et al., "DIRT—Discovery of Inference Rules from Text", In Proc. of the ACM SIG KDD Conf. on Knowledge Discovery and Data Mining, 2001.

B. MacCartney et al., "Learning to recognize features of valid textual entailments", In Proceedings of the Human Language Technology Conference of the North American Chapter of the Association for Computational Linguistics (HLT-NAACL 2006), 2006, New York, NY, 2006.

John T. Maxwell III et al., "The Interface between Phrasal and Functional Constraints", Computational Linguistics, Dec. 19, 1993; 19 (4).

Deborah L. McGuinness et al., "From Description Logic Provers to Knowledge Representation Systems". In Franz Baader, Diego Calvanese, Deborah McGuinness, Daniele Nardi, and Peter Patel-Schneider, (eds.) The Descriptin Logic Handbook: Theory, Implementation, and Applications. Cambridge University Press, 2003.

D. Moldovan et al., "COGEX: A Logic Prover for Question Answering", In Proc. of the HLT-NAACL 2003, 2003, Main Papers, p. 87-93, Edmonton, Alberta, Canada.

D. I. Moldovan et al., "Logic Form Transformation of WordNet and its Applicability to Question Answering", in Proceedings of the ACL 2001 Conference, Jul. 2001, Toulouse, France.

William McCune,"Otter 3.3 Reference Manual", Technical Memorandum No. 263, Aug. 2003, Argonne National Laboratory, Argonne, IL.

R. Nairn et al., "Computing relative polarity for textual inference", Inference in Computational Semantics (ICoS-5), Apr. 20-21, 2006, Buxton, UK.

E. Newman et al., UCD IIRG Approach to Textual Entailment Challenge, In Proc. of the PASCAL Challenges Workshop on Recognising Textual Entailment, Apr. 11-13, 2005, Southhampton, UK.

E. Nyberg et al., "JAVELIN: A Flexible, Planner-Based Architecture for Question Answering", In Proc. of the HLT-NAACL 2003, Demonstrations, May 2003, pp. 19-20, Edmonton, Alberta, Canada.

M. A. Pasca et al., "High Performance Question/Answering", SIGIR. Sep. 9-12, 2001, New Orleans, LA, USA ACM 2001.

D. Perez et al., "Application for the Bleu algorithm for recognizing textual entailments", In Proc. of the PASCAL Challenges Workshop on Recognising Textual Entailment, Apr. 11-13, 2005, Southhampton, UK.

V. Punyakanok et al., "Natural Language Inference via Dependency Tree Mapping: An Application to Question Answering", UIUC Tech Report No. UIUCDS-R-2004-2640, Jan. 2004, University of Illinois at Urbana-Champaign, Computer Science Department.

R. Raina et al., "Robust Textual Inference using Diverse Knowledge Sources", In Proc. of the PASCAL Challenges Workshop on Recognising Textual Entailment, Apr. 11-13, 2005, Southhampton, UK.

R. Raina et al., "Robust textual inference via learning and abductive reasoning", In Proceedings of AAAI 2005, 2005, AAAI Press.

S. Sinha et al., "Model-based Answer Selection"; In Inference for Textual Question Answering: Papers from the 2005 AAAI Workshop, ed. Sanda Harabagiu, Dan Moldovan, Srini Narayanan, Christopher Manning, Daniel Bobrow, Ken Forbus, 24-31. Technical Report WS-05-05. American Association for Artificial Intelligence, Menlo Park, California.

T. Smith et al., "Determining Plausability of Answers to Questions", In Inference for Textual Question Answering: Papers from the 2005 AAAI Workshop, ed. Sanda Harabagiu, Dan Moldovan, Srini Narayanan, Christopher Manning, Daniel Bobrow, Ken Forbus 24-31. Technical Report WS-05-05. American Association for Artificial Intelligence, Menlo Park, California.

L. Tari et al., "Using AnsProlog with Link Grammar and WordNet for QA with deep reasoning",In Inference for Textual Question Answering: Papers from the 2005 AAAI Workshop, ed. Sanda Harabagiu, Dan Moldovan, Srini Narayanan, Christopher Manning, Daniel Bobrow, Ken Forbus, 24-31. Technical Report WS-05-05. American Association for Artificial Intelligence, Menlo Park, California.

M. Tatu et al., "A Semantic Approach to Recognizing Textual Entailment", In Proc. of the Human Language Technology Conf. and Conf. on Empirical Methods in Natural Language Processig, Oct. 2005, pp. 371-378, Association for Computational Linguistics, Vancouver, BC Canada.

L. C. Ureel II et al., "Question Generation for Learning by Reading", In Inference for Textual Question Answering: Papers from the 2005 AAAI Workshop, ed. Sanda Harabagiu, Dan Moldovan, Srini Narayanan, Christopher Manning, Daniel Bobrow, Ken Forbus, 24-31. Technical Report WS-05-05. American Association for Artificial Intelligence, Menlo Park, California.

L. Vanderwende et al., "What Syntax can Contribute in Entailment Task", In Proc. of the PASCAL Challenges Workshop on Recognising Textual Entailment, Apr. 11-13, 2005, Southhampton, UK.

M. Verhagen et al, "Automating Temporal Annotation with Tarsqi", In Porc. of the ACL Interactive Poster and Demonstration Sessions, Jun. 2005, pp. 81-84, Ann Arbor, MI, Association for Computational Linguistics.

D. Wu, "Texual Entailment Recognition Based on Inversion Transduction Grammars", In Proc. of the PASCAL Challenges Workshop on Recognising Texual Entailment, Apr. 11-13, 2005, Southhampton, UK.

The Packed Rewriting System (Transfer) Documentation, Xerox Corporation 1999-2001, Palo Alto Research Center Incorporated 2002-2006.

J. T. Maxwell III, R. M. Kaplan, "A Method for Disjunctive Constraint Satisfaction", in M. Tomita (ed.) Current Issues in Parsing Technology, Kluwer, 1991, 173-190.

\* cited by examiner

Nobody saw a man.

FIG. 8

| TOP LEVEL CHOICE | TERM |
|---|---|
| 1 | role (Experiencer, see##3, person##0) |
| 1 | role(Stimulus, see##3, man##5) |
| 1 | temporalRel(startsAfterEndingOf, Now, see##3) |
| 1 | context(cx_see##3) |
| 1 | context(t) |
| 1 | context_relation(not, t, cx_see##3) |
| 1 | instantiable(man##5, cx_see##3) |
| 1 | instantiable(person##0, cx_see##3) |
| 1 | instantiable(see##3, cx_see##3) |
| 1 | uninstantiable(see##3, t) |
| 1 | subconcept(man##5, [[10133569,..., 7626,..., 1740], [10423788,..., 1740], [10135377,..., 1740], [2449786,..., 1740]]) |
| 1 | subconcept(person##0, [[7626,..., 1740], [5155976,..., 1740], [6242281,..., 1740]]) |
| 1 | subconcept(see##3, [[2131231], [1620934], [911004]]) |

FIG. 9

Nobody saw a man with a telescope.

FIG. 10

| TOP LEVEL CHOICE | TERM |
|---|---|
| 1 | role (Experiencer, see##13, person##10) |
| 1 | role(Stimulus, see##13, man##15) |
| 1 | temporalRel(startsAfterEndingOf, now, see##13) |
| A1 | role(with, see##13, telescope##16) |
| A2 | role(with, man##15, telescope##16) |
| 1 | context(cx_see##13) |
| 1 | context(t) |
| 1 | context_relation(not, t, cx_see##13) |
| 1 | instantiable(man##15, cx_see##13) |
| 1 | instantiable(person##10, cx_see##13) |
| 1 | instantiable(see##13, cx_see##13)\ |
| 1 | instantiable(telescope##16, cx_see##13) |
| 1 | uninstantiable(see##13, t) |
| 1 | subconcept(man##15, [[10133569,..., 7626,..., 1740], [10423788,..., 1740], [10135377,..., 1740], [2449786,..., 1740]]) |
| 1 | subconcept(person##10, [[7626,..., 1740], [5155976,..., 1740], [6242281,..., 1740]]) |
| 1 | subconcept(see##13, [[2131231], [1620934], [911004]]) |
| 1 | subconcept(telescope##16, [[4341615,..., 1740]]) |

FIG. 11

| CONCEPT | CONCEPT HYPERNYM LISTS |
|---|---|
| subconcept(premise_sk) | [[1,2,3,4,1740],[5,6,7,8,1740],[9,10,11,1740]] |
| | |
| | |
| subconcept(conclusion_sk) | [[22,5,6,7,8,1740],[27,28,1740]] |

FIG. 12

| TERM | SCORES |
|---|---|
| t | [1.0 - t, 0.0 - cx_see##3] |
| see##13: | [1.0 - see##3, 0.0 - person##0, 0.0 - man##5] |
| man##15: | [1.0 - person##0, 1.0 - man##5, 0.0 - see##3] |
| person##10: | [1.0 - person##0, 1.0 - man##5, 0.0 - see##3] |
| cx_see##13: | [0.8 - cx_see##3, 0.0 - t] |
| telescope##16: | [0.428 - person##0, 0.333 - man##5, 0.0 - see##3] |

FIG. 13

| INDEX | PAIRING |
|---|---|
| 1 | t=t, see##13=see##3, man##15=person##0, person##10=man##5, cx_see##13=cx_see##3, telescope##16=NULL |
| 2 | t=t, see##13=see##3, man##15=man##5, person##10=person##0, cx_see##13=cx_see##3, telescope##16=NULL |

FIG. 14

| TOP LEVEL CHOICE | TERMS |
|---|---|
| 1 | premise(role(Experiencer, see##3, person##0)) |
| 1 | premise(role(Stimulus, see##3, man##5)) |
| 1 | premise(temporalRel(startsAfterEndingOf, Now, see##3)) |
| 1 | conclusion(role(Experiencer, see##3, person##0)) |
| 1 | conclusion(role(Stimulus, see##3, man##5)) |
| 1 | conclusion(temporalRel(startsAfterEndingOf, Now, see##3)) |
| A1 | conclusion(role(with, see##3, telescope##16)) |
| A2 | conclusion(role(with, man##5, telescope##16)) |
| 1 | premise(context(cx_see##3)) |
| 1 | premise(context(t)) |
| 1 | premise(context_relation(not, t, cx_see##3)) |
| 1 | conclusion(context(cx_see##3)) |
| 1 | conclusion(context(t)) |
| 1 | conclusion(context_relation(not, t, cx_see##3)) |
| 1 | premise(instantiable(man##5, cx_see##3)) |
| 1 | premise(instantiable(person##0, cx_see##3)) |
| 1 | premise(instantiable(see##3, cx_see##3)) |
| 1 | premise(uninstantiable(see##3, t)) |
| 1 | conclusion(instantiable(man##5, cx_see##3)) |
| 1 | conclusion(instantiable(person##0, cx_see##3)) |
| 1 | conclusion(instantiable(see##3, cx_see##3)) |
| 1 | conclusion(instantiable(telescope##6, cx_see##3)) |
| 1 | conclusion(uninstantiable(see##3, t)) |
| 1 | premise(subconcept(man##5,[[10133569,..., 7626,..., 1740], [10423788,..., 1740],[10135377,..., 1740],[2449786,..., 1740]])) |
| 1 | premise(subconcept(person##0,[[7626,..., 1740], [5155976,..., 1740],[6242281,..., 1740]])) |
| 1 | premise(subconcept(see##3,[[2131231],[1620934],[911004]])) |
| 1 | conclusion(subconcept(man##5,[[10133569,..., 7626,..., 1740], [10423788,...., 1740],[10135377,..., 1740],[2449786,...1740]])) |
| 1 | conclusion(subconcept(person##0,[[7626,..., 1740], [5155976,..., 1740],6242281,..., 1740]])) |
| 1 | conclusion(subconcept(see##13,[[2131231], [1620934],[911004]])) |
| 1 | conclusion(subconcept(telescope##16,[[4341615,..., 1740]])) |

FIG. 15

| TOP LEVEL CHOICE | SUBSUMPTION |
|---|---|
| A1 | more_specific(man##5, mutual) |
| A2 | more_specific(man##5, conclusion) |
| 1 | more_specific(see##3, conclusion) |
| 1 | more_specific(person##0, mutual) |
| 1 | more_specific(telescope##16, conclusion) |

FIG. 16

| INDEX | TYPE | RULE |
|---|---|---|
| 1 | SUBSUMPTION | Q:subconcept(%Sk, %QConcept)<br>P:subconcept(%Sk, %PConcept)<br>{%QConcept ⊂ %PConcept}<br>==><br>prelim_more_specific(%Sk, P). |
| 2 | SUBSUMPTION | Q:subconcept(%Sk, %QConcept)<br>P:subconcept(%Sk, %PConcept)<br>{%QConcept=%PConcept}<br>==><br>prelim_more_specific(%Sk, mutual). |
| 3 | ROLE RESTRICTION | prelim_more_specific(%Sk, %PM)<br>member(%PM, [P, mutual])<br>P:role(%, %Sk, %)<br>-- Q:role(%, %Sk, %)<br>==><br>more_specific(%Sk, P). |
| 4 | ROLE RESTRICTION | prelim_more_specific(%Sk, P)<br>-- P:role(%, %Sk, %)<br>Q:role(%, %Sk, %)<br>==><br>0. |
| 5 | INSTANTIATION | more_specific(%Sk, P),<br>P:instantiable(%Sk, %Ctx)<br>Q:instantiable(%Sk, %Ctx)<br>==><br>0. |
| 6 | INSTANTIATION | more_specific(%Sk, P),<br>P:instantiable(%Sk, %Ctx)<br>Q:uninstantiable(%Sk, %Ctx)<br>==><br>contradiction. |
| 7 | CLEANUP | Q:%Fact,<br>P:%Fact<br>==><br>0. |
| 8 | CLEANUP | Q:in_context(%C1, %Fact)<br>P:in_context(%C2, %Fact)<br>anti_veridical(%C1, %C2)<br>==><br>contradiction. |

FIG. 17

SYSTEMS AND METHODS FOR DETECTING ENTAILMENT AND CONTRADICTION

BACKGROUND OF THE INVENTION

1. Field of Invention

This invention was made with Government support under 2004*H892800*000 awarded by DST/ATP. The Government has certain rights in this invention.

This invention relates to information retrieval.

2. Description of Related Art

Entailment describes a relationship indicating that one element can be derived from another element. Entailment between texts is complicated since word order and word co-occurrence can render a text susceptible to multiple readings. For example, in English, the placement of the same word or phrase at different locations within a sentence can result in several readings or interpretations. Some researchers have attempted to address these problems by encoding the text into packed knowledge representations. The packed knowledge representations provide an encoding of the multiple readings for the text within a single representation. Although packed knowledge representations can encode these multiple readings, conventional linguistic processing still requires unpacking to detect entailment and contradiction.

SUMMARY OF THE INVENTION

Thus, systems and methods for detecting entailment and contradiction in packed knowledge representations would be useful. The systems and methods according to this invention provide for operating on contexted unions of packed knowledge representations to detect entailment and contradiction. The systems and methods according to this invention determine packed structures for a premise and conclusion text. Rewrite rules are applied to the packed structures to determine packed knowledge representations. The knowledge representations comprise facts about the relationships between concept and/or context denoting terms. Concept alignments for the packed structures are determined. Alignment of context denoting terms is also performed and a union of the premise and conclusion packed knowledge representations is determined. The terms of the union are marked as to their origin in the premise or conclusion text. Comparison between the terms in the premise and conclusion are facilitated by, substituting the terms between the premise and conclusion, using an alignment table or the like. Various embodiments according to this invention replace conclusion terms by corresponding terms from the premise. Subsumption and specificity, instantiability, spatio-temporal and relationship based packed rewrite rules are applied in conjunction with the context denoting facts to remove entailed terms and to mark contradictory facts within the union.

BRIEF DESCRIPTION OF THE DRAWINGS

FIG. 8 is an exemplary first sentence.

FIG. 9 is an exemplary data structure for storing a packed knowledge representation of the first exemplary sentence according to one aspect of this invention;

FIG. 10 is a second exemplary sentence.

FIG. 11 is an exemplary data structure for storing a packed knowledge representation of the second exemplary sentence according to one aspect of this invention;

FIG. 12 is a visualization of exemplary concept overlap according to one aspect of this invention;

FIG. 13 is an exemplary data structure for storing alignment scores for the premise and conclusion packed knowledge representations according to one aspect of this invention;

FIG. 14 is an exemplary data structure for storing term pair scores according to one aspect of this invention;

FIG. 15 is an exemplary data structure for storing content and context aligned packed knowledge representation according to one aspect of this invention;

FIG. 16 is an exemplary set of subsumption facts according to one aspect of this invention; and FIG. 17 is an exemplary data structure for storing packed rewrite rules 1100 according to one aspect of this invention.

DETAILED DESCRIPTION OF EXEMPLARY EMBODIMENTS

Figure 1:
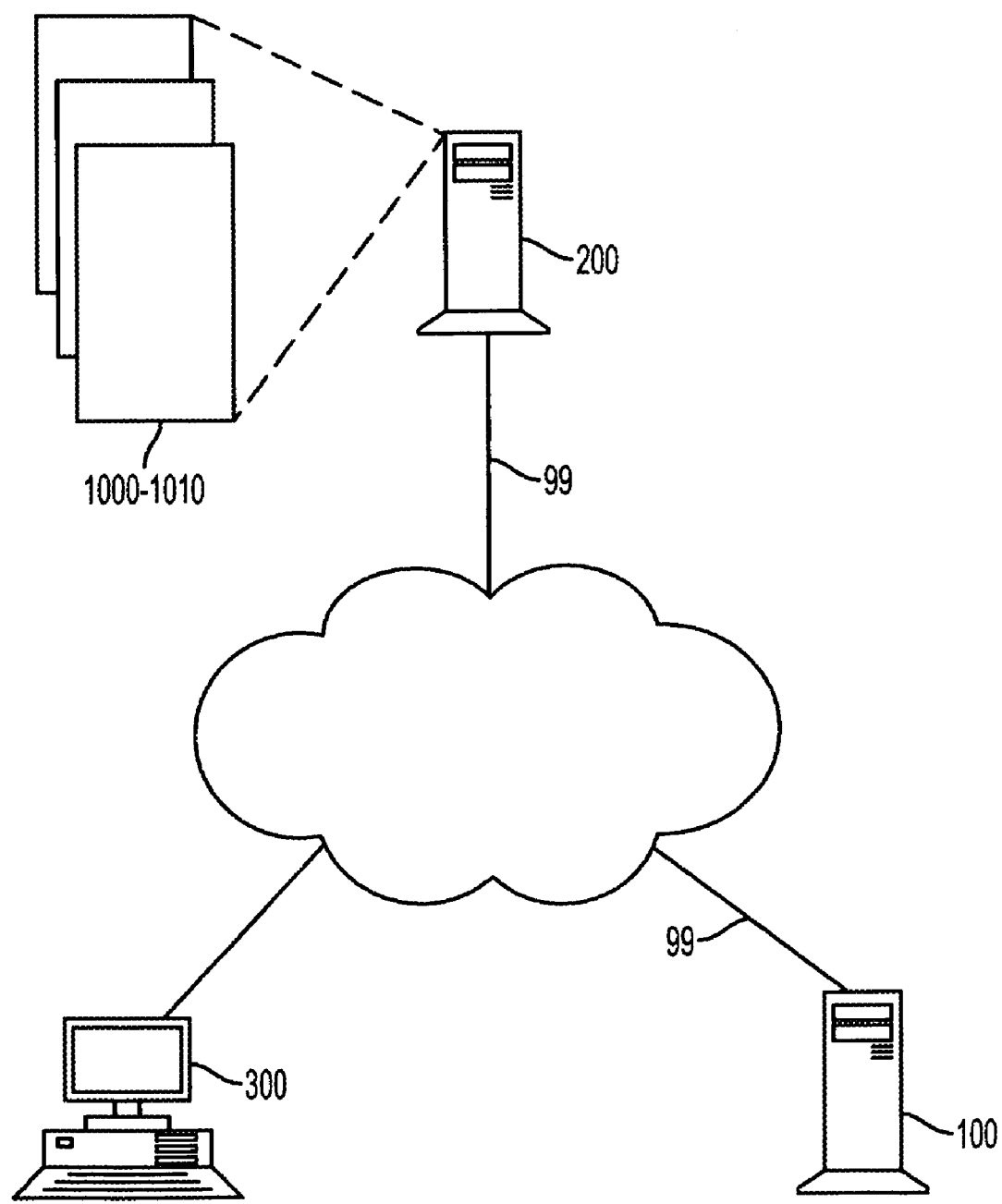
FIG. 1 shows an exemplary overview of an entailment and contradiction detection system according to this invention.

FIG. 1 shows an exemplary overview of an entailment and contradiction detection system 100 according to this invention. The entailment and contradiction detection system 100 is connected via communications links 99 to an information repository 200 providing access to documents 1000-1010 and to a communications enabled personal computer 300.

In one exemplary embodiment, a user of the communications-enabled personal computer 300 poses a question with respect to the document collection 1000-1010. The query is forwarded over the communications links 99 to the entailment and contradiction detection system 100. The entailment and contradiction detection system 100 acts as a proxy. It selects a sub-set of documents relevant to the question using a first search. The relevant documents from the search results 1000-1010 are retrieved over the communications links 99. The entailment and contradiction detection system 100 determines whether any sentences in the relevant documents 1000-1010 are entailed or contradicted by the question. That is, the entailment and contradiction detection system 100 determines entailment and contradiction between the packed structure associated with question and a plurality of packed structures associated with sentences or other structures within the search result documents 1000-1010.

For example, in one embodiment, the relevance or ranking of a document containing text entailed to the question is given increased prominence as more likely indicating a relevant answer to the question. The relevance of contradictory terms is similarly adjusted. The ranked search results are then optionally displayed to the user.

Figure 2:
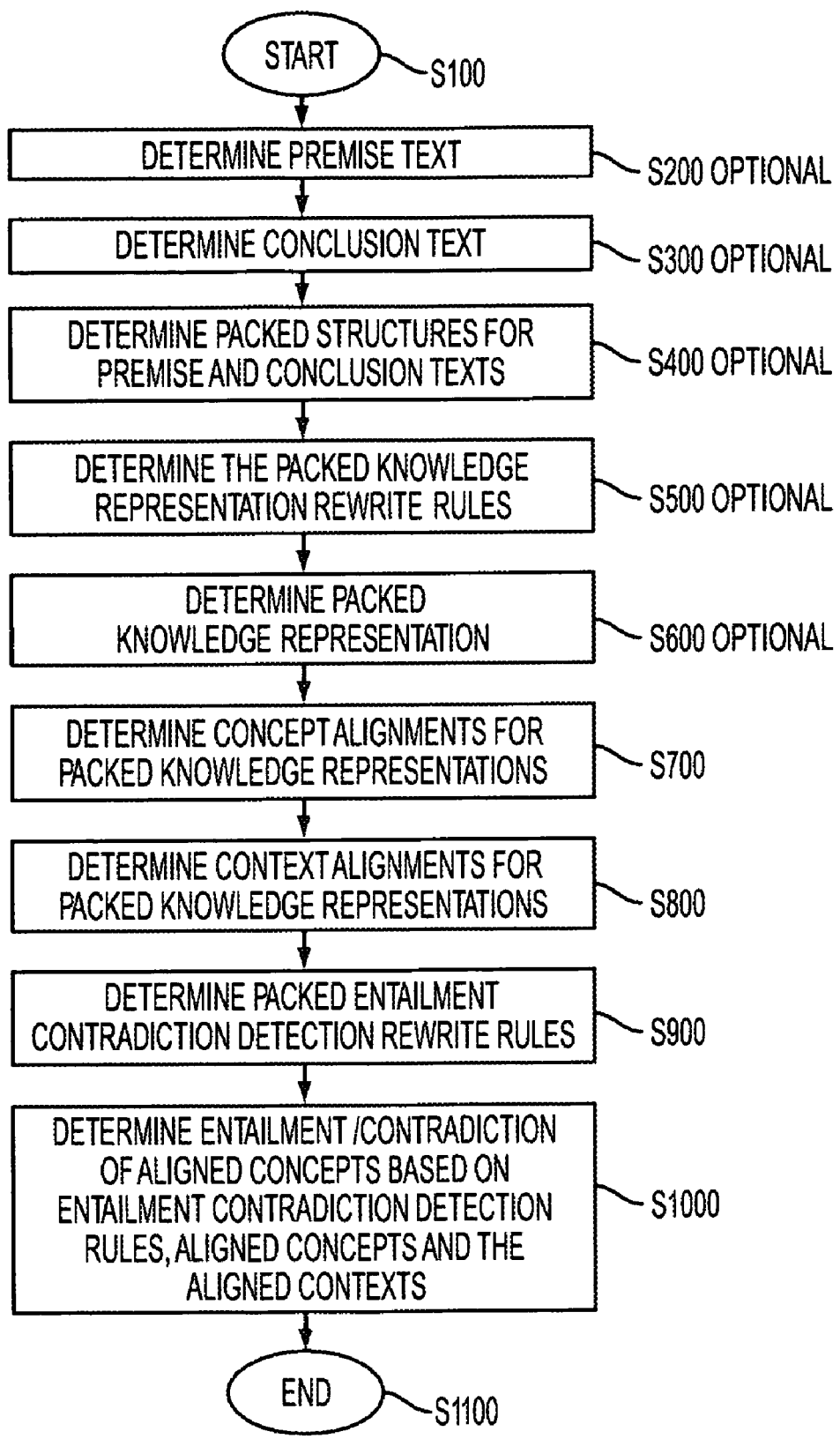
FIG. 2 is a flowchart of an exemplary method for detecting entailment and detection according to this invention.

FIG. 2 is a flowchart of an exemplary method for detecting entailment and detection according to this invention. The process begins at step S100 and immediately continues to step S200. In step S200, a premise text is selected. In various embodiments directed to questions and answers, the premise text is usually a portion of a document or other element of an information repository. The premise text may be entered by a user, selected from document or entered using an input or selection method. After the premise text has been selected, control continues to step S300.

In step S300, the conclusion text is selected. In embodiments directed to question answering, the conclusion text is generally a question posed by a user, selected from a document or entered using any an input or selection method. Once the premise and conclusion texts have been determined, control continues to step S400.

The packed structures are determined for the premise and conclusion texts in step S400. Packing is a way of compactly encoding a number of alternative representations. Determining packed structures is discussed further by J. Maxwell and R. Kaplan in "A method for disjunctive constraint satisfaction" in M. Tomita (ed) Current Issues in Parsing Technology, Kluwer, 1991 and in U.S. Pat. No. 5,438,511, both herein incorporated by reference in their entirety. A packed representation comprises a choice space and a choice labeled representation. The choice space is a Boolean and/or tree detailing how the choice labels are related to one another. Each part of the representation is labeled to indicate the parts of the choice space in which the representation applies. For computational efficiency, the choice space is maintained in a free-choice form in which the satisfiability of any boolean combination of choice labels can efficiently be checked.

In embodiments utilizing the parsing system of the Xerox Linguistic Environment (XLE), the packed structures are packed f-structures. However, any known or later developed method of determining a packed structure for the texts may be used without departing from the spirit or scope of this invention. After the packed structures have been determined, control continues to step S500.

In step S500, packed knowledge representation rewrite rules are determined. The rules may be retrieved from a memory, a database or other storage medium. The packed knowledge representation rewrite rules transform the packed structures into packed knowledge representations by cross referencing concepts contained within the packed structures to hierarchical ontologies such as WordNet® and the like. Packed rewrite rules are of the form A, +B, -C=>D. This rule will inspect a set of input facts to see if there any facts matching A and B, and ensure that there are no facts matching D. In each circumstance in which the match holds, the matching A fact will be removed from the set of facts, the B facts will be left in place, and the D fact will be added. The rewrite rules are thus production rules that in general consume input matching the left hand side of the arrow to produce output matching right hand side. Packed rewriting systems apply these rules to packed sets of input facts to produce packed sets of output facts. Packed rewriting systems are discussed further by R. Crouch, in "Packed rewriting for mapping semantics to KR" in Proc 6th International Workshop on Computational Semantics, Tilburg, The Netherlands, 2005, herein incorporated by reference in its entirety. After the packed knowledge representation rewrite rules have been determined, control continues to step S600.

The knowledge representation rewrite rules are applied to the packed structure to create packed knowledge representations in step S600. The packed knowledge representations may be CycL, Knowledge Machine, DAML+OIL or other knowledge representations. Once the packed knowledge representation has been created, control continues to step S700.

In step S700, concept alignments are determined for the packed knowledge representations. Alignment ensures that similar terms are compared between knowledge representations. In one exemplary embodiment, the concepts are aligned by extracting terms from the premise and conclusion texts. Each term from the premise knowledge representation is paired with a term from the conclusion knowledge representation. Lists of synonyms and/or hypernyms from WordNet® or other ontologies are used to determine alignment scores for each term pairing. The alignment scores of pairs that exceed a threshold alignment score are selected as probable alignments. In question answering embodiments, the information contained in the question or premise text may be exploited to refine or even determine the most probable term pairs. Probable term pairs are optionally ranked based on the number of roles with less probable term pairs considered later than more probable term pairs. After the concept alignments have been determined, control continues to step S800.

Context alignments are determined for each packed knowledge representation in step S800. Context terms are associated with concepts, and the method of pairing and ranking concept terms is applied to the context terms. After the context alignments have been determined, control continues to step S900.

In step S900, a set of entailment and contradiction detection packed rewrite rules is selected. The rules may be retrieved from a memory, a database or any other storage structure. Once the rules have been determined, control continues to step S1000.

The entailment and contradiction detection packed rewrite rules determined in step S900 are applied to the concept and context aligned packed knowledge representations in step S1000. A union of the premise and conclusion packed knowledge representations is determined. The packed entailment and contradiction rules determine subsumption, cardinality, instantiability and spatio-tempo relations among the terms and facts of the packed knowledge representations that are capable of reduction or elimination.

One concept subsumes another if it refers to a more general class of objects. If the set of objects satisfying concept C1 includes the set of objects satisfying C2, then C1 subsumes C2. Alternative terminology: C2 is more specific than C1, C1 is more general than C2. One formula subsumes another if it refers to a more general set of circumstances in which it holds true. Entailment is indicated by a lack of any facts from the packed knowledge representation of the conclusion in the union after applying the packed entailment and contradiction detection rules.

Contradiction markers are added to indicate contradictory terms in the packed knowledge representation. Where the conclusion text indicates a question, a premise text might be a candidate answer to the question. If the premise or candidate answer text is entailed, then it is more likely to be a positive answer to the question. Thus, in various embodiments, a conventional tf-idf search is applied to initially select texts. Entailment and contradiction detection are applied to rank and/or order the search results. Texts in the search results that are marked as neither entailed nor contradictory are eliminated from consideration in the ranking. The re-ranked results are then returned to the user. After detecting entailment and contradiction, control continues to step S1100 and the process ends.

Figure 3:
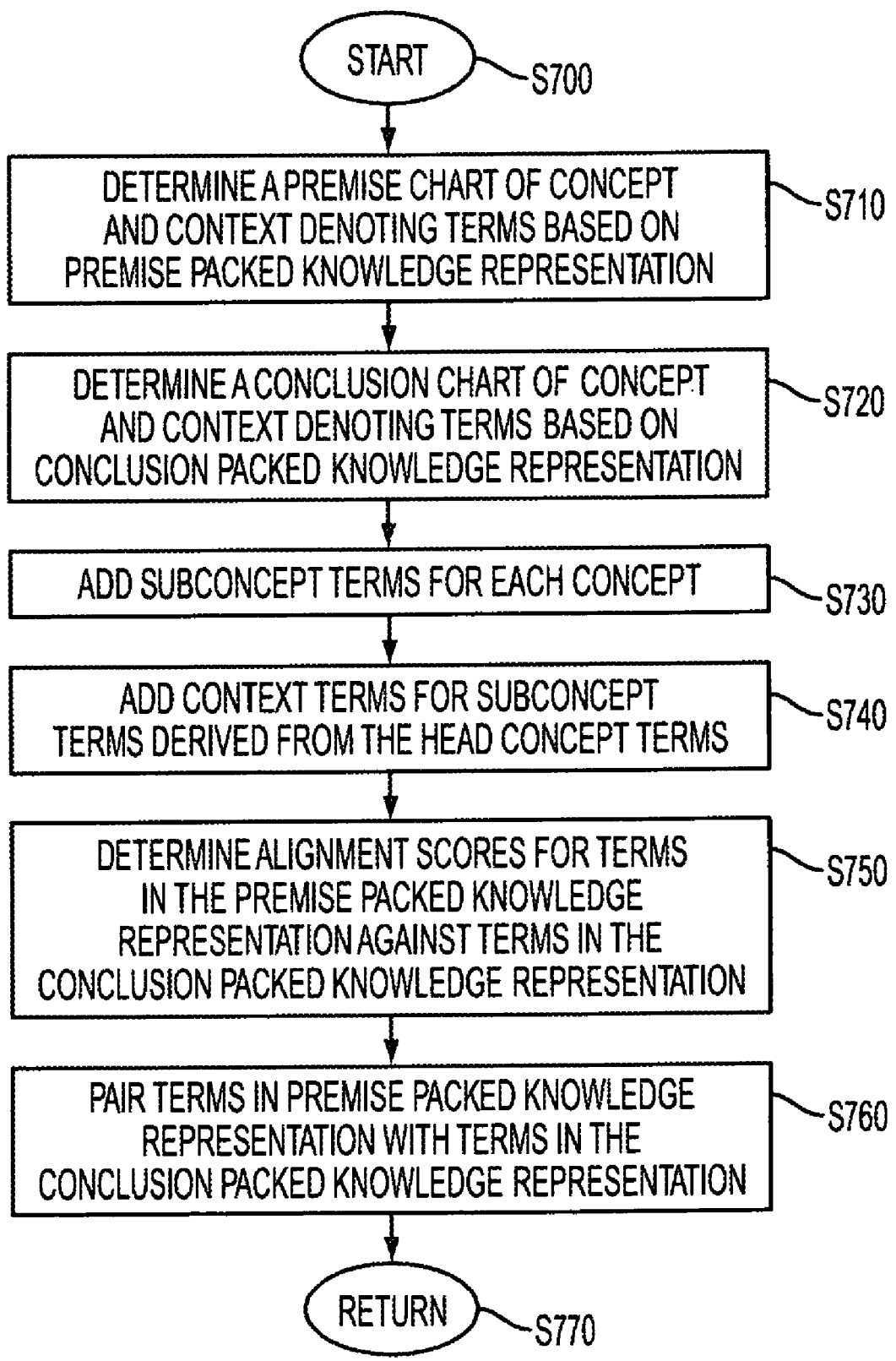
FIG. 3 is an expanded flowchart of a method for concept alignment according to one aspect of this invention.

FIG. 3 is an expanded flowchart of a method for concept alignment according to one aspect of this invention. The process begins at step S700 and immediately continues to step S710. In step S710, a premise chart of concept and context denoting terms is determined. In one exemplary embodiment, each concept in the premise packed knowledge representation is inserted into a chart. The context denoting terms are also inserted into the chart. After the premise chart is created, control continues to step S720 where the process is repeated with the second packed knowledge representation to create a conclusion chart. Control then continues to step S730.

In step S730, subconcept terms are added to the chart for each concept. WordNet or other ontological resources are used to determine a set of subconcepts based on hypernym lists associated with each term. In various other embodiments, the subconcepts are derived from external systems such as Cyc or the like. After adding the subconcept terms to the premise and conclusion charts, control continues to step S740.

Sub-concept terms are added to the premise and conclusion charts for each context term in step S740. Each context term is associated with a characteristic concept term, typically derived from the verb that heads the clause introducing the context. The sub-context for the associated head concept term is used to mark the context term. After the sub-concept terms have been added for each context term, control continues to step S750.

In step S750, a set of alignment scores for terms in the premise packed knowledge representation are computed against terms in the conclusion packed knowledge representation. The alignment scores indicate the degree to which the terms conceptually overlap. Thus, in an embodiment utilizing the WordNet ontology, the overlap between a set of hypernyms associated with a term from the premise packed knowledge representation and a set of hypernyms associated with a term from the conclusion packed knowledge representation is used to determine a pair alignment score. Weighting of the overlapping items and other methods can also be used to determine and/or further adjust the alignment scores. After the alignment scores have been determined, control continues to step S760.

Sets of term pairs are selected based on their alignment scores in step S760. In various embodiments, a threshold value is determined from user input or retrieved from memory. Terms pairs associated with alignment scores above the threshold value are selected as aligned term pairs. Each set of term pairings will align every concept or context term from the premise text with some concept or context term from the conclusion text. Multiple sets of alignments are possible and alignment sets are ranked in a best-first order determined by the alignment scores of the individual term pairings. After the term pairs have been selected, control continues to step S770 and immediately jumps to step S700 of FIG. 2.

Figure 4:
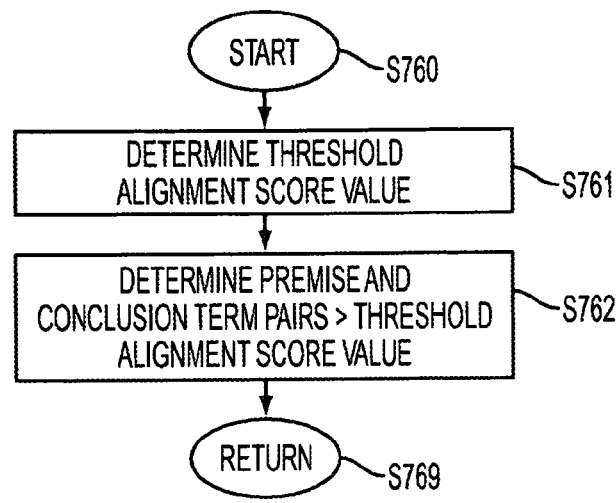
FIG. 4 is an exemplary first expanded flowchart for selecting sets of possible term pairings according to one aspect this invention.

FIG. 4 is an exemplary first expanded flowchart for selecting sets of possible term pairings according to one aspect this invention. The process begins at step S760 and immediately continues to step S761 where a threshold score value is selected. The threshold score indicates acceptable score values to be considered for term pairing. For example, a threshold alignment score value of 0.5 indicates that term pairs with an alignment score equal to or greater than 0.5 are selected. The threshold alignment score depends on the term alignment scoring method and is adjustable. After the threshold alignment score value has been specified, control continues to step S762.

In step S762, each term from the conclusion text is paired with a term from the premise text, starting with the individual term pairing that has the best alignment score. With the exception of terms derived from either proper names or pronouns, no two distinct terms from the premise text can be paired with the same term from the conclusion text. Individual alignments falling below the threshold alignment score value are excluded. Control then continues to step S769 and immediately returns step S760 of FIG. 3.

Figure 5:
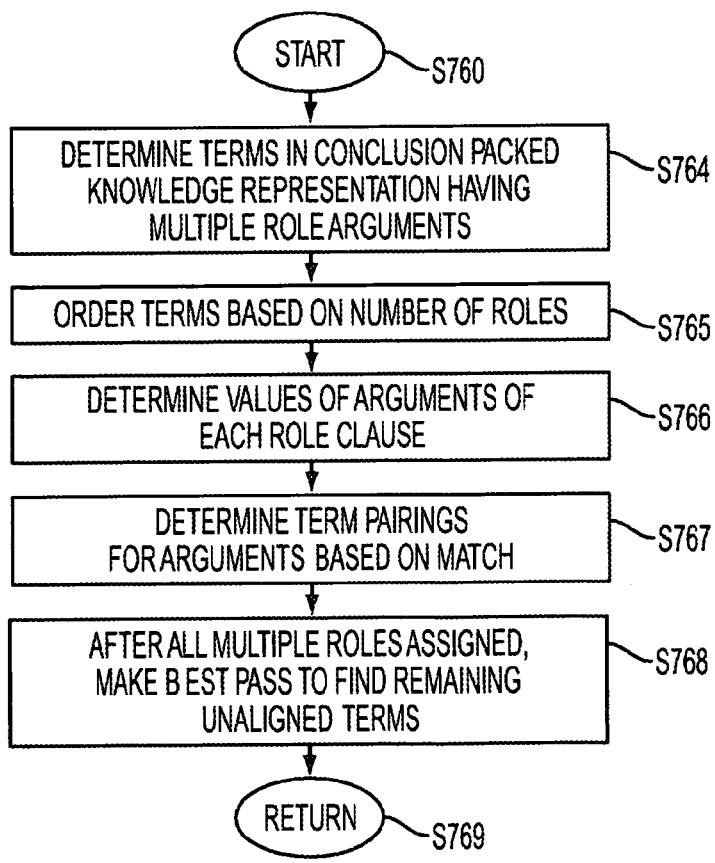
FIG. 5 is an exemplary second expanded flowchart for selecting sets of possible term pairings according to one aspect of this invention.

FIG. 5 is an exemplary second expanded flowchart for selecting sets of possible term pairings according to one aspect of this invention. The process begins at step S760 and immediately continues to step S764. In step S764, the terms originating in the conclusion packed knowledge representation and which have multiple role arguments are determined. For example, concept terms derived from verbs will often have multiple role arguments from the subject role, or the complement role. Terms having multiple role arguments are identified by the presence of role facts in the knowledge representation linking the term to the different arguments. Control then continues to step S765.

In step S765, the terms are ordered based on the number of roles. Thus, terms with a larger number of roles are selected first. After the terms have been ordered, control continues to step S766 where the values of the arguments of each clause are determined. Control then continues to step S767.

Each term with multiple role arguments in the packed knowledge representation of the conclusion is paired with a term in the packed knowledge representation of the premise in step S767. The role facts for the paired terms are matched. For any role facts that match, the corresponding role argument terms in the premise and conclusion packed knowledge representations are also paired. Control then continues to step S768.

In step S768, a final best pass assigns remaining unaligned terms. Control then continues to step S769 and immediately returns to step S760 of FIG. 3.

Figure 6:
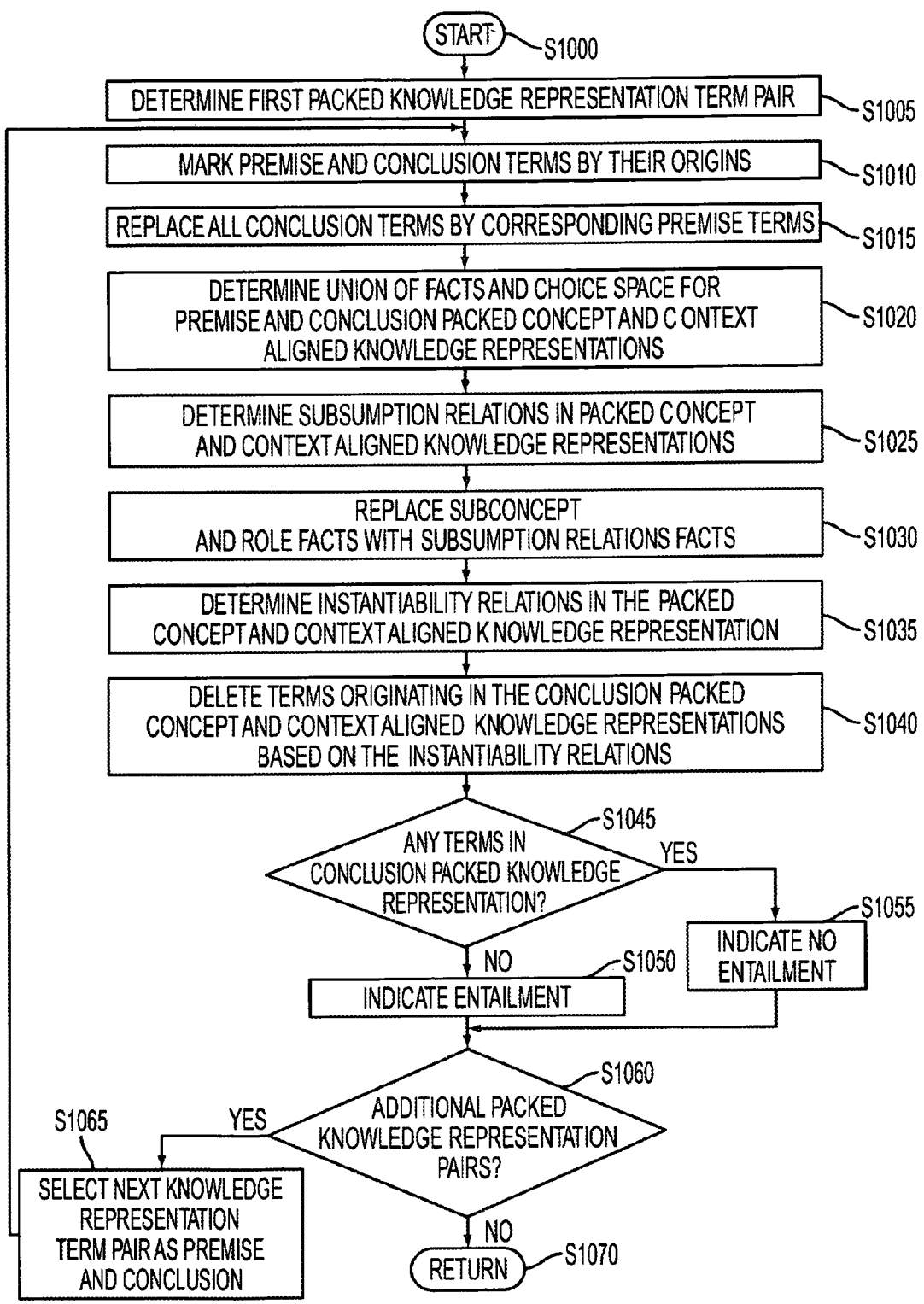
FIG. 6 is a flowchart of an exemplary method of detecting entailment and contradiction according to one aspect of this invention.

FIG. 6 is a flowchart of an exemplary method of detecting entailment and contradiction according to one aspect of this invention. The process begins at step S1000 and immediately continues to step S1005 where a first pair of content and context aligned packed knowledge representations terms are selected. The set of paired terms is selected from the list of concept and context aligned terms determined in the previous steps. In various embodiments, the paired terms are ranked. For example, the information from a question can be used to rank the likelihood of the terms appearing in the text. This is repeated for each term pair in the premise and conclusion packed knowledge representations. After the premise packed knowledge representation term pair has been identified, control continues to step S1010.

Facts from the premise and conclusion packed knowledge representations are labeled to explicitly mark whether the fact is from the premise or conclusion representation in step S1010. The facts originating in the premise text are marked with a premise representation marker while facts originating in the conclusion text are marked with a conclusion representation marker. After the facts have been marked, control continues to step S1015.

In step S1015, the facts and contexts marked as originating from the conclusion packed knowledge representation are replaced by the aligned terms originating from the premise packed knowledge representation as determined by the set of alignments selected in step S1005. Control then continues to step S1020.

The union of the facts and choice space of the premise and conclusion concept and context aligned packed knowledge representations is determined in step S1020. Forming unions of packed knowledge representations is further discussed inco-assigned, co-pending application U.S. patent application Ser. No. 10/338,846, now issued as U.S. Pat. No. 7,171,403 herein incorporated by reference in its entirety. After the union has been determined, control continues to step S1025.

In step S1025, any subsumption relations that exist between terms in the content and context aligned packed knowledge representations are determined. The subsumption relations identify terms originating in the conclusion packed knowledge representation that are subsumed within a term originating in the packed knowledge representation of the premise. After the subsumption relations have been determined, control continues to step S1030. The subsumption relation facts are then substituted into the union of the premise and conclusion packed knowledge representations. The subconcept terms originating in the packed knowledge representation of the conclusion are replaced by the facts of the subsumption relation. These operations reduce the number of terms from the packed knowledge representation of the conclusion in the union. After the subconcept facts and roles have been replaced, control continues to step S1035.

Instantiability relations in the concept and context aligned packed knowledge representation are determined in step S1035. For example, to say that a particular concept term is instantiable in a certain context is to assert the existence of some object satisfying the terms concept description. To say that a concept term is uninstantiable in a context is to say that there is no such object in that context that satisfies the term's concept description. After the instantiability relations have been determined, control continues to step S1040.

In step S1040, instantiable and uninstantiable facts originating in the packed knowledge representation of the conclusion are removed based on the instantiability rules. The instantiability rules determine for example, that the instantiability of a more specific term entails the instantiability of a more general term, and the uninstantiability of a more general term contradicts the instantiability of a more specific term. Entailed instantiability and uninstantiability originating from the packed representation of the conclusion are removed by the instantiability rules. Contradicted instantiability and uninstantiability facts are marked as such. Control then continues to step S1045.

A determination is made as to whether any terms from the packed knowledge representation of the conclusion remain in the union in step S1045. If any terms remain, control immediately continues to step S1055 an indication is then made to the user that the conclusion text is not entailed by the premise text. Otherwise, if no terms remain, control continues to step S1050 where entailment is indicated to the user. In various exemplary embodiments, dynamic indication to the user is accomplished via changes to the user's display or output device. However, it will be apparent that entailment indicators may be stored in memory for asynchronous indication to the user or used under programmatic control without departing from the scope of this invention. After any entailment is indicated, control continues to step S1060.

In step S1060 a determination is made as to whether any additional packed knowledge representations remain. If additional packed knowledge representation pairs remain, control continues to step S1065 where the next pair of content and context aligned knowledge representation terms is selected. Control then jumps immediately to step S1010.

Steps S1010-S1060 repeat until no additional content and context aligned packed knowledge representation term pairs remain to be processed. Control then continues to step S1070 and returns immediately to step S1000 of FIG. 2.

It should be apparent that the packed knowledge representations for multiple texts may be determined previously or dynamically as required without departing from the scope of this invention.

Figure 7:
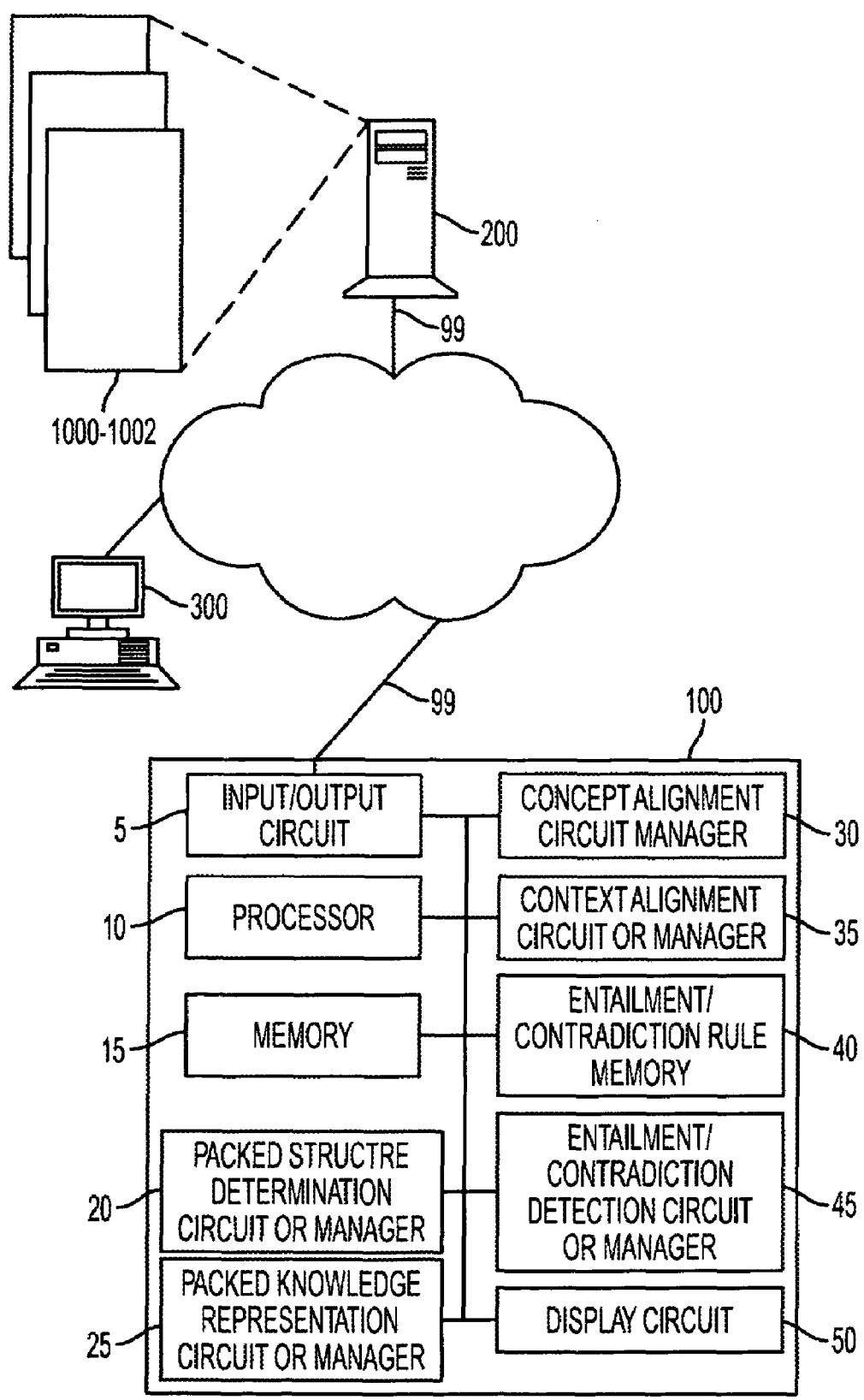
FIG. 7 is an exemplary system for detecting entailment and contradiction according to one aspect of this invention.

FIG. 7 is an exemplary system for detecting entailment and contradiction according to one aspect of this invention. The entailment and contradiction detection system 100 is connected via communications links 99 to an information repository 200 providing access to documents 1000-1002 and to a communications enabled personal computer 300.

The user of the communications-enabled personal computer 300 initiates a query against the document collection 1000-1010 served by the information repository 200. The query is forwarded over the communications links 99 to the information repository 200. The information repository selects the documents relevant to the query using term frequency inverse document frequency and/or other information retrieval systems. The search results are then forwarded to the input/output circuit 5 of the entailment and contradiction detection system 100.

The processor 10 of the entailment and detection system 100 activates the packed memory determination circuit or manager 20 to determine packed structures associated with the query and each retrieved search result. The processor 10 activates the optional packed knowledge representation circuit or manager 25 to determine a packed knowledge representation using packed rewrite rules.

The concept alignment circuit or manager 30 is activated to align the concept facts between the packed knowledge representation for the query expressed as a possible conclusion and the packed knowledge representation for the first search result or premise. The context alignment circuit or manager 25 aligns the context of the packed knowledge representation of the conclusion and the first premise. The concept alignment circuit or manager 30 ensures that similar terms are compared between packed knowledge representations. Each term from the premise knowledge representation is paired with a term from the conclusion knowledge representation. Lists of synonyms and/or hypernyms from WordNet® or other ontologies are used to determine alignment scores for each term pairing.

The alignment scores of pairs that exceed a threshold alignment score are selected as probable alignments. In question answering embodiments, the information contained in the conclusion or question text is exploited to determine the most probable term pairs. Probable term pairs are optionally ranked based on the number of roles with less probable term pairs considered later than more probable term pairs.

The processor 10 forms the union of the facts and choice space for the packed representations of the conclusion and the premise and marks each term with its origin. The context terms are then associated with concepts. The method of pairing and ranking concept terms is then also applied to the context terms.

The terms originating in the conclusion are substituted with corresponding terms from the premise. The entailment contradiction circuit or manager 45 retrieves the entailment/contradiction rules from the entailment/contradiction rule memory 40 and applies them to the union.

The packed entailment and contradiction rules determine subsumption, cardinality, instantiability and spatio-tempo relations among the terms and facts of the packed knowledge representations capable of reduction or elimination. When each fact of the conclusion knowledge representation has been removed, entailment is indicated. Contradiction markers are added to indicate contradictory terms in the packed knowledge representation. The processor 10 activates the display circuit 50 to indicate the entailment and the contradictions. The process is then repeated between the conclusion and each additional search result as subsequent premises. In various embodiments according to this invention, the entailment and contradiction information is used to adjust the prominence of the documents in the search results. The processor 10 activates the input/output circuit 5 to forward the re-ranked search results to the user of communications-enabled computer 300 over communications links 99.

FIG. 8 is an exemplary first sentence. The first sentence is short and unambiguous.

FIG. 9 is an exemplary data structure for storing a packed knowledge representation 400 of the first exemplary sentence according to one aspect of this invention. The packed knowledge representation captures content and context information about the sentence. The packed knowledge representation is comprised of a top level choice portion 410 and a term portion 420. The values in the top level choice portion 410 are used to indicate top level choices between ambiguous readings of a sentence. However, in this case, each row is marked with the value "1" indicating that there is only one top level choice and therefore no alternate reading of the sentence.

The first three rows of the exemplary data structure for storing packed knowledge indicate that a seeing event was experienced by a person. A temporal relation specifies the event occurs before now. The role relations specify in general terms that a seeing event took place, that what was seen was some kind of man and that the event was experienced by some kind of a person. The next three rows specify the context for the information. In particular, the values "context(cx_see##3)" and "context(t)" specify a first context called "cx_see##3" and a second "true" context. The sixth row specifies that the two contexts are incompatible. By implication, cx_see##3 is the negative context.

The seventh through ninth rows claims instantiability for the terms "man##5", "person##0", and "see##3" in the cx_see##3 context. The seeing event "see##3" is claimed to be uninstantiable in the "t" context. The rows eleven through thirteen contain facts associating lists of WordNet synonyms sets with the constants "man##5", "person##0" and "see##3". In various other embodiments, other ontologies can be used without departing from the spirit or scope of this invention.

FIG. 10 is a second exemplary sentence. The second exemplary sentence is capable of two readings and is therefore ambiguous. Thus, one reading might be that nobody saw a man who had a telescope. A second reading is that nobody saw a man by looking through a telescope.

FIG. 11 is an exemplary data structure for storing a packed knowledge representation 500 of the second exemplary sentence according to one aspect of this invention. The packed knowledge representation is comprised of a top level choice portion 510 and a term portion 520. The values "A1" and "A2" in the top level choice portion 510 indicate the two different possible readings of the sentence. This packed knowledge representation differs from the packed knowledge representation of the first exemplary sentence in the presence of the "telescope" term which is instantiable in the "cx_see##13" context. The "telescope" term is also affected by role restrictions appearing in row four through five. The subconcepts are described in terms of WordNet synsets as discussed above.

The detection that the packed knowledge representation of the first exemplary sentence entails the packed knowledge representation of the second exemplary sentence is based on noticing that if there is no event of a person seeing a man, then there is no more specific event of a person seeing a man by means of a telescope (reading "A1"), nor is there any event of a person seeing a more specific kind of man in possession of a telescope (reading "A2"). In terms of the two packed knowledge representations shown above, it can be shown that the concept "see##13" of the packed knowledge representation associated with the second exemplary sentence is more specific than the corresponding "see##3" concept in the packed knowledge representation associated with the first exemplary sentence. In reading "A1", there is an additional role restriction on "see##13" that is absent for "see##3". In reading "A2", there is no additional role on "see##13", but one of its arguments "man##15" has an additional role restricting it to a more specific concept. From these specificity relations ("see##13" as or more specific than "see##3", "man##15" as or more specific than "man##5"), it can be reasoned as follows. The aligned contexts "cx_see##3" and "cx_see##13" are downward monotone, meaning that a more general instantiability entails a more specific instantiability. Thus all the instantiability claims for "cx_see##13" are entailed by those in "cx_see##3", including that for the "telescope##16" concept not even mentioned in "cx_see##3".

In contrast, "t" is an upward monotone context where (a) more specific instantiabilities imply more general ones, and (b) more general uninstantiabilities imply more specific ones. Thus the uninstantiability of "see##13" in "cx_see##13" is entailed by the uninstantiability of "see##3" in "cx_see##3". This means that all the instantiability and uninstantiability assertions in the packed knowledge representation associated with the second exemplary sentence are entailed by those in the packed knowledge representation associated with the first exemplary sentence. The temporal relations in the two representations are identical (other than renaming of aligned constants) and so are mutually entailing. Hence everything in the packed knowledge representation associated with the second sentence is entailed by the packed knowledge representation associated with the first exemplary sentence.

FIG. 12 is a visualization of exemplary concept overlap according to one aspect of this invention. The exemplary subconcept represented by premise_sk overlaps with the exemplary subconcept represented by conclusion_sk for the terms "5, 6, 7 and 8". Thus, these terms are candidates for alignment.

FIG. 13 is an exemplary data structure for storing alignment scores for the premise and conclusion packed knowledge representations 700 according to one aspect of this invention. The exemplary data structure for storing alignment scores for the premise and conclusion packed knowledge representations 700 is comprised of a terms portion 710 and a scores portion 720.

The terms portion 710 of the first row contains the value "t:" indicating the alignment score values for the "true" context. The scores portion 720 contains the value pairs "1.0–t" and "0.0–cx_see##3". These values indicate a high alignment score between the "true" context in the packed knowledge representation of the premise and the "true" context in the packed knowledge representation of the conclusion. However, a low alignment score is indicated between the t context of the packed knowledge representation of the premise and the "cx_see##3" context.

The fifth row contains the value "cx_see##13" in the term portion 710 and the values "0.8–cx_see##3" and "0.0–t" in the scores portion 720. This indicates alignment between the "cx_see##13" context and the "cx_see##3" alignment is preferred. The contextual alignment allows the systems and methods of this invention to exploit the monotonicity constraints or relationships in determining entailment and contradiction.

The second row contains the value "see##13" in the term portion 710 and the values "1.0–see##3, 0.0–person##0, 0.0–man##5". These value indicate a preferred alignment between the concepts "see##13" and "see##3". The third row indicates equally preferred alignments between the concept "man##15" and "person##0" and "person##5", the fourth row equally preferred alignments between "person##10" and "person##0" and "man##5". The sixth row indicates that the concept "telescope##16" is not aligned with either "person##0", "man##5" or "see##3", since each alignment score is below the exemplary threshold alignment score value of "0.5".

Some rules of inference are applied based on the terms specificity, montonicity and existence/instantiability assertions. For example, the packed rewrite entailment and contradiction rules provide for recognizing: 1) if term_p is more specific than term_c, then in an upward monotone context the existence of term_c is entailed by the existence of term_p. Rewrite rules recognize this configuration, and remove the existence assertion for term_c. Removal of this assertion is motivated by the fact that if the assertion is entailed by the premise representation, it can be removed without loss of information; 2) if term_p is less specific than term_c, then in a downward monotone context the existence of term_c is entailed by the existence of term_p. Rewrite rules recognize this configuration, and remove the existence assertion for term_c; 3) if term_p is less specific than term_c, then in an upward monotone context the non-existence of term_p contradicts the existence of term_c. Rewrite rules recognize this configuration, and instead of removing the existence assertion for term_c, they set a flag indicating that a contradiction has been found.

FIG. 14 is an exemplary data structure for storing term pair scores 800 according to one aspect of this invention. The exemplary data structure for storing term pair scores 800 is comprised of an index portion 810 and a pairing portion 820.

The first row of the exemplary data structure for storing term pair scores 800 contains the value "1" in the index portion 810 and the value "t=t, see##13=see##3, man##15=person##0, person##10=man##5, cx_see##13=cx_see##3, telescope##16=NULL" in the pairing portion. This indicates proposed pair terms for the entailment detection. In various exemplary embodiments according this invention, the pairings are scored or ranked by various methods. For example, in some embodiments, the format of a conclusion text that is a question informs the selection of the most likely term pairings for the answer to the question.

FIG. 15 is an exemplary data structure for storing content and context aligned packed knowledge representation 900 according to one aspect of this invention. The exemplary data structure for storing a content and context aligned packed knowledge representation 900 is comprised of a top level choice portion 910 and a terms portion 920.

Initially, the exemplary data structure for storing content and context aligned packed knowledge representation 900 is formed from the union of the packed knowledge representation for the premise and packed knowledge representation of he conclusion. The terms are marked with respect to their origin and the entailment and contradiction rules are applied.

If no conclusion terms remain after the entailment and contradiction rules have been applied to the content and context aligned packed knowledge representation 900, entailment is indicated to the user. Otherwise, a lack of entailment is indicated to the user. Contradictions are similarly detected, marked and indicated to the user.

FIG. 16 is an exemplary set of subsumption facts 1000 according to one aspect of this invention. The exemplary set of subsumption facts 1000 are comprised of a top level choice portion 1010 and a subsumption portion 1020. The first row contains "A1" in the top level choice portion 1010 and the value "more_specific(man##5, mutual)" in the subsumption portion 1020. The subsumption facts are determined by applying packed entailment and contradiction rewrite rules based on subsumption/specificity relations; cardinality; instantiability and spatio-temporal relationships.

For example, subsumption/specificity rules base subconcept assignments on concept inclusions, role restrictions from argument structure, cardinality and the like. Thus, terms "man##5", "person##0" and "see##3" occur in both the premise and the term substituted conclusion. They have identical assignments in both. Thus the initial judgment is that the terms mutually subsume in the premise and conclusion. Role restrictions are used to further refine this initial assessment. In the top level choice "see##3" has an additional conclusion role with "telescope##16". This means that in the "A1" top level choice, "see##3" is more specific in the conclusion. In regard to top level choice "A2", "man##5" has an additional conclusion role, making it more specific in the conclusion. "Man ##5" is a role restriction on "see##3" which means that "A2" "see##3" is also more specific in the conclusion. Thus, all subsumption and role facts are eliminated and replaced by the exemplary set of subsumption facts 1000.

Instantiability rules are then applied to determine the consequences of these specificity relations on instantiability claims. For an upward monotone context, instantiability of a specific concept entails instantiability of a more general concept, uninstantiability of a general concept entails uninstantiability of a more specific concept, instantiability of a specific concept contradicts uninstantiability of a more general concept and vice versa. For downward monotone contexts, the relations are reversed. The top level context, "t", is upward monotone. The embedded context, "cx_see##3" is recognized as being downward motonone through being linked to "t" via the context relation "not". Rules encoding the instantiability relations eliminate all the instantiable and uninstantiable facts for the conclusion. When all the conclusion facts have been eliminated the premise entails the conclusion.

FIG. 17 is an exemplary data structure for storing packed rewrite rules 1100 according to one aspect of this invention. The data structure for storing packed rewrite rules 1100 is comprised of an optional index portion 1110; an optional type portion 1110 and a rule portion 1130.

The first row of the exemplary data structure for storing packed rewrite rules 1100 contains the values "1", "SUBSUMPTION" and "Q:subconcept(%Sk, %QConcept), P:subconcept(%Sk, %PConcept), {%QConcept ⊂%PConcept}=>prelim_more_specific(%Sk, P)."

The "1" value in the optional index portion 1110 indicates the number of the rule within the system providing a human readable label for the rule. Any unique identifier can be used as the index value. The "SUBSUMPTION" value in the optional type portion 1120 indicates the category or function of the rule. The value in the rule portion 1130 is composed of pattern and action portions separated by the "=>" indicator. If the pattern on the left hand side of the separation indicator is identified, the action on the right hand side of the separator indicator is performed. The left hand side of the rule looks for a concept term %Sk that is marked by an input facts as having the associated subconcept %QConcept in the query (Q) and is also marked by another input fact as having the associated subconcept %PConcept in the premise (P). A test is made to see is %QConcept is more specific the %PConcept. If the test succeeds, then the two matching input facts are removed, and a new fact added to the output: prelim_more_specific(%Sk, P). This states that the term %Sk has preliminarily been judged to denote a more specific concept in the premise P. The rule is activated by all pairs of input facts that match the left hand side.

The second row contains the value "2" in the index portion 1110. This is a human readable unique reference number for accessing the rule. The type portion of the second row contains the value "SUBSUMPTION". This indicates the classification or type of the rule in a human accessible format. The rule portion 1130 contains the value "Q:subconcept(%Sk, %QConcept), P:subconcept(%Sk, PConcept) {%QConcept=%PConcept}=>prelim_more_specific(%Sk, mutual)." The left hand side of the rule looks for input facts saying that some term %Sk is associated with the same concept (%QConcept=%PConcept) is both Query and Premise, and replace the facts with an assertion that the term denotes mutually specific concepts in query and passage.

The third row contains the value "3" in the index portion 1110 indicating the human readable reference number for the rule. The type portion contains the value "ROLE RESTRICTION" indicating that the rule is classified as a type of rule affecting role restrictions in the packed knowledge representations. The rule portion 1130 contains the value "prelim_more_specific(%Sk, %PM), {member(%PM, [P, mutual])}, P:role(%, %Sk, %), −Q:role(%, %Sk, %)=>more_specific(%Sk, P)." This matches a term %Sk that (i) has already been judged to be preliminarily more specific either mutually or in the premise, (ii) which has some further role restriction fact in the premise, but (iii) does not have any role restriction facts in the query. When the left hand side of the rule matches, a fact asserting that the term is more specific in the premise is added, and the preliminary judgment of specificity removed.

The fourth row contains the value "4" in the index portion 1110 indicating the human readable reference number for the rule. The type portion contains the value "ROLE RESTRICTION" indicating that the rule is classified as a type of rule affecting role restrictions in the packed knowledge representations. The rule portion 1130 contains the value "prelim_more_specific(%Sk, P), −P:role(%, %Sk, %) Q:role(%, %Sk, %)=>0" This matches a fact stating that term %Sk has been preliminarily judged to be more specific in the Premise, that %Sk has no role restrictions in the Premise, but that it does have some role restrictions in the query. Under these circumstances, no judgment can be made about whether %Sk is more, less, or equally specific in premise or query. The prelim_more_specific(%Sk, P) and Q:role(%, %Sk, %) facts are removed from the input, and nothing is added in their place.

The fifth row contains the value "5" in the index portion 1110 indicating the human readable reference number for the rule. The type portion contains the value "INSTANTIATION" indicating that the rule is classified as a type of rule affecting instantiations in the packed knowledge representations. The rule portion 1130 contains the value "more_specific(%Sk, P), P:instantiable(%Sk, %Ctx), Q:instantiable (%Sk, %Ctx)=>0." This matches a term %Sk that is more specific in the premise, and is marked as being instantiable in context %Ctx in both premise and query. The instantiability of the more specific concept in the premise entails the instantiability of the more general concept in the query, so the query instantiability fact can be removed as being entailed.

The sixth row contains the value "6" in the index portion 1110 indicating the human readable reference number for the rule. The type portion contains the value "INSTANTIATION" indicating that the rule is classified as a type of rule affecting instantiations in the packed knowledge representations. The rule portion 1130 contains the value "more_specific(%Sk, P), P:instantiable(%Sk, %Ctx), Q:uninstantiable (%Sk, %Ctx)=>contradiction" Term %Sk is more specific in the premise, is instantiable in context %Ctx in the premise, but uninstantiable in %Ctx in the query. This indicates a contradiction, and this is flagged by adding a new "contradiction" fact to the output The seventh row contains the value "7" in the index portion 1110 indicating the human readable reference number for the rule. The type portion contains the value "CLEANUP" indicating that the rule is classified as a type of rule affecting cleanup processing in the packed knowledge representations. The rule portion 1130 contains the value "Q:%Fact, P:%Fact=>0." This rule applies after entailments and contradictions through specificity and instantiability have been determined. At this stage, if the same facts occur in both query and premise, the query fact can be removed as possibly entailed. If the query fact is not actually entailed, then there will be some remaining query facts about concept specificity and instantiability to ensure that the query will not accidentally come to be judged as entailed by the premise.

The eighth row contains the value "8" in the index portion 1110 indicating the human readable reference number for the rule. The type portion contains the value "CLEANUP" indicating that the rule is classified as a type of rule affecting cleanup processing in the packed knowledge representations. The rule portion 1130 contains the value "Q:in_context(%C1, %Fact) P:in_context(%C2, %Fact) anti_veridical (%C1,%C2)=>contradiction." This detects identical facts in premise and query, but where those facts are asserted to hold in contradictory (anti-veridical) contexts. In such cases, a "contradiction" fact is added to the output.

The rules illustrated above are examples of a wider set of rules that could be defined and applied to detect entailment and contradiction In the various embodiments of the entailment and contradiction detection system 100, each of the circuits 10-60 outlined above can be implemented as portions of a suitably programmed general-purpose computer. Alternatively, 10-60 of the entailment and contradiction detection system 100 outlined above can be implemented as physically distinct hardware circuits within an ASIC, or using a FPGA, a PDL, a PLA or a PAL, or using discrete logic elements or discrete circuit elements. The particular form each of the circuits 10-60 of the entailment and contradiction detection system 100 outlined above will take is a design choice and will be obvious and predictable to those skilled in the art.

Moreover, the entailment and contradiction detection system 100 and/or each of the various circuits discussed above can each be implemented as software routines, managers or objects executing on a programmed general purpose computer, a special purpose computer, a microprocessor or the like. In this case, the entailment and contradiction detection system 100 and/or each of the various circuits discussed above can each be implemented as one or more routines embedded in the communications network, as a resource residing on a server, or the like. The entailment and contradiction detection system 100 and the various circuits discussed above can also be implemented by physically incorporating the entailment and contradiction detection system 100 into software and/or hardware system, such as the hardware and software systems of a web server or a client device.

As shown in FIG. 7, memory 15 and entailment/contradictions rule memory 40 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 99 shown in FIGS. 1 & 6, can each be any known or later developed device or system for connecting a communication device to the entailment and contradiction detection system 100, including a direct cable connection, a connection over a wide area network or a local area network, a connection over an intranet, a connection over the Internet, or a connection over any other distributed processing network or system. In general, the communication links 99 can be any known or later developed connection system or structure usable to connect devices and facilitate communication.

Further, it should be appreciated that the communication links 99 can be wired or wireless links to a network. The network can be a local area network, a wide area network, an intranet, the Internet, or any other distributed processing and storage network.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A system for indicating entailment and contradiction in text comprising:
   a packed knowledge representation manager that determines premise and conclusion packed knowledge representations, the premise and conclusion packed knowledge representations each including premise and conclusion facts about relationships between concept terms;
   a concept alignment manager that aligns corresponding concepts between the premise packed knowledge representation and the conclusion packed knowledge representation; and
   an entailment/contradiction manager that determines a concept aligned union of the packed knowledge representations of the premise and the conclusion with concept terms marked as to origin and which substitutes relevant packed knowledge representation concept terms for comparison, removes concept terms based on a plurality of entailment/contradiction rules retrieved from an entailment/contradiction rule storage and indicates entailment and contradiction.

2. The system of claim 1, in which a knowledge representation is comprised of hierarchical concept information elements from an ontology and relationship elements specifying relationships between the concept elements and concept element instances.

3. The system of claim 1, further comprising a context alignment circuit that aligns contexts between the premise packed knowledge representation and the conclusion packed knowledge representation, the premise and conclusion packed knowledge representations each further including premise and conclusion facts about relationships between context terms.

4. The system of claim 1, further comprising a display manager that displays the indicated entailment and contradiction on a display device.

5. The system of claim 1, in which the premise and conclusion terms are combined in a union.

6. The system of claim 1, in which at least one of: entailed and contradicted terms, are marked.

7. The system of claim 1, in which at least one of: entailed and contradicted terms, are indicated.

8. The system of claim 7, in which the entailment is indicated by at least one human sensible display characteristic.

9. A method for indicating entailment and contradiction comprising the steps of:
   determining premise and conclusion packed knowledge representations, the premise and conclusion packed knowledge representations each including premise and conclusion facts about relationships between concepts;
   determining concept alignments for concepts within the premise and conclusion packed knowledge representations;
   detecting entailment and contradiction in the packed knowledge representations based on the concept alignments and a set of entailment and contradiction detection rewrite rules.

10. The method of claim 9, in which the packed knowledge representations are based on natural language text.

11. The method of claim 10, in which the source of the natural language text is at least one of: a written text and non-written text.

12. The method of claim 11, in which the non-written natural language source is at least one of: audio and visual information.

13. The method of claim 12, in which the visual information is at least one of: sign language and a communicative gesture.

14. The method of claim 12, in which the audio and visual information is automatically recognized to a text.

15. The method of claim 9, in which the packed knowledge representation is based on packed structures determined from the premise and the conclusion texts.

16. The method of claim 15, packed representations are at least one of: packed f-structures, packed semantic representations, packed knowledge representations.

17. The method of claim 15, in which the entailment and contradiction detection rules are based on at least one of: subsumption, specificity, instantiability, roles, cardinality and relationship information.

18. The method of claim 17, in which the relationships information includes at least one of: spatial and temporal relationship information.

19. The method of claim 17, in which the specificity information is determined using an ontological hierarchy.

20. The method of claim 19, in which the specificity information is based on role restrictions.

21. The method of claim 9, in which the packed knowledge representations are associated with at least one of: unambiguous text and disambiguated packed representations.

22. A computer readable storage medium comprising computer readable program code embodied on the computer readable storage medium, the computer readable program code useable to program a computer to indicate textual entailments and contradictions comprising the steps of:

determining premise and conclusion packed knowledge representations, the premise and conclusion packed knowledge representations each including premise and conclusion facts about relationships between concepts;

determining concept alignments for concepts within the premise and conclusion packed knowledge representations;

detecting entailment and contradiction in the packed knowledge representations based on the concept alignments, the context alignments and a set of entailment and contradiction detection rewrite rules.

23. A computer implemented method for conceptually aligning premise and conclusion texts comprising the steps of:

determining packed knowledge representations for the premise and conclusion texts, the packed knowledge representations each including premise and conclusion facts about relationships between concepts related to the premise and conclusion texts;

determining concept alignments for concepts within the packed knowledge representations of the premise and the conclusion;

displaying the aligned packed knowledge representations.

* * * * *